United States Patent
Yamamoto et al.

(10) Patent No.: US 11,383,670 B2
(45) Date of Patent: Jul. 12, 2022

(54) SIDE AIRBAG APPARATUS

(71) Applicant: TOYODA GOSEI CO., LTD., Kiyosu (JP)

(72) Inventors: Shuji Yamamoto, Kiyosu (JP); Takashi Iida, Kiyosu (JP); Kenichi Fukurono, Kiyosu (JP); Koki Tanaka, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 0 days.

(21) Appl. No.: 17/018,106

(22) Filed: Sep. 11, 2020

(65) Prior Publication Data

US 2021/0094505 A1 Apr. 1, 2021

(30) Foreign Application Priority Data

Sep. 30, 2019 (JP) .............................. JP2019-178631
Sep. 30, 2019 (JP) .............................. JP2019-178632
Mar. 25, 2020 (JP) .............................. JP2020-054467

(51) Int. Cl.
*B60R 21/231* (2011.01)
*B60R 21/233* (2006.01)
(Continued)

(52) U.S. Cl.
CPC ...... *B60R 21/23138* (2013.01); *B60R 21/207* (2013.01); *B60R 21/233* (2013.01);
(Continued)

(58) Field of Classification Search
CPC ............ B60R 21/207; B60R 21/23138; B60R 21/233; B60R 21/2338; B60R 21/2346;
(Continued)

(56) References Cited

U.S. PATENT DOCUMENTS 6,270,113 B1 * 8/2001 Wipasuramonton ........................ B60R 21/2346
280/730.2
6,976,702 B2 * 12/2005 Yokota .............. B60R 21/23138
280/729

(Continued)

FOREIGN PATENT DOCUMENTS

JP 2005-186891 A 7/2005
JP 2014136452 A * 7/2014
(Continued)

*Primary Examiner* — Laura Freedman
(74) *Attorney, Agent, or Firm* — Posz Law Group, PLC

(57) ABSTRACT

A side airbag apparatus includes an airbag that is configured to be deployed and inflated between a body side portion of a vehicle and an occupant seated in a seat in a passenger compartment by a pressure of gas supplied from an inflator. The airbag includes an outer bag and an inner bag, which is provided in the outer bag and accommodates the inflator. The inner bag includes an upper-side inflation portion, which projects forward when inflated to correspond to the shoulder of the occupant, a lower-side inflation portion, which projects forward when inflated to correspond to the lumbar region of the occupant, and a recessed portion, which is provided between the upper-side inflation portion and the lower-side inflation portion. The inner bag includes a connecting hole that connects the inside and the outside of the inner bag to each other.

6 Claims, 11 Drawing Sheets

(51) Int. Cl.
  *B60R 21/2338* (2011.01)
  *B60R 21/239* (2006.01)
  *B60R 21/207* (2006.01)
  *B60R 21/235* (2006.01)
(52) U.S. Cl.
  CPC ........ *B60R 21/239* (2013.01); *B60R 21/2338* (2013.01); *B60R 2021/23107* (2013.01); *B60R 2021/23146* (2013.01); *B60R 2021/23332* (2013.01); *B60R 2021/23382* (2013.01); *B60R 2021/23509* (2013.01); *B60R 2021/23538* (2013.01); *B60R 2021/23576* (2013.01)
(58) Field of Classification Search
  CPC ................ B60R 21/235; B60R 21/239; B60R 2021/23107; B60R 2021/23146; B60R 2021/23324; B60R 2021/23332; B60R 2021/23382; B60R 2021/23509; B60R 2021/23538; B60R 2021/23576
  See application file for complete search history.

(56) References Cited

U.S. PATENT DOCUMENTS

| | | | | |
|---|---|---|---|---|
| 7,152,876 | B2 * | 12/2006 | Hofmann | B60R 21/23138 280/743.1 |
| 7,156,418 | B2 * | 1/2007 | Sato | B60R 21/23138 280/730.2 |
| 7,192,050 | B2 * | 3/2007 | Sato | B60R 21/23138 280/729 |
| 7,347,444 | B2 * | 3/2008 | Wheelwright | B60R 21/23138 280/729 |
| 7,431,329 | B2 * | 10/2008 | Taguchi | B60R 21/23138 280/729 |
| 7,448,645 | B2 * | 11/2008 | Bederka | B60R 21/207 280/730.2 |
| 7,611,164 | B2 * | 11/2009 | Kai | B60R 21/207 280/728.1 |
| 7,770,921 | B2 * | 8/2010 | Mueller | B60R 21/2346 280/739 |
| 8,056,923 | B2 * | 11/2011 | Shimono | B60R 21/2346 280/730.2 |
| 8,419,060 | B2 * | 4/2013 | Yamamoto | B60R 21/23138 280/743.2 |
| 8,528,934 | B2 * | 9/2013 | Kobayshi | B60R 21/207 280/740 |
| 8,714,588 | B2 * | 5/2014 | Honda | B60R 21/20 280/730.2 |
| 8,757,657 | B1 * | 6/2014 | Hotta | B60R 21/263 280/730.2 |
| 8,783,712 | B2 * | 7/2014 | Fukushima | B60R 21/233 280/730.2 |
| 9,039,037 | B2 * | 5/2015 | Fukushima | B60R 21/2346 280/730.2 |
| 9,180,836 | B2 * | 11/2015 | Hotta | B60R 21/207 |
| 9,254,811 | B2 * | 2/2016 | Hayashi | B60R 21/233 |
| 9,296,356 | B2 * | 3/2016 | Fujiwara | B60R 21/235 |
| 9,409,542 | B2 * | 8/2016 | Fujiwara | D05B 13/00 |
| 9,505,369 | B2 * | 11/2016 | Iida | B60R 21/23138 |
| 9,505,375 | B2 * | 11/2016 | Kobayashi | B60R 21/239 |
| 9,533,605 | B2 * | 1/2017 | Fujiwara | B60R 21/239 |
| 9,598,043 | B2 * | 3/2017 | Kobayashi | B60R 21/207 |
| 9,676,365 | B2 * | 6/2017 | Tsukagoshi | B60R 21/239 |
| 9,849,857 | B2 * | 12/2017 | Fujiwara | B60R 21/233 |
| 9,969,348 | B2 * | 5/2018 | Fujiwara | B60R 21/207 |
| 10,166,945 | B2 * | 1/2019 | Fujiwara | B60R 21/233 |
| 10,766,448 | B2 * | 9/2020 | Wiscombe | B60R 21/233 |
| 10,829,080 | B2 * | 11/2020 | Taguchi | B60R 21/239 |
| 2015/0097359 | A1 | 4/2015 | Rickenbach et al. | |
| 2015/0115583 | A1 | 4/2015 | Azuma | B60R 21/233 280/740 |
| 2015/0367806 | A1 * | 12/2015 | Fujiwara | B60R 21/239 280/729 |
| 2016/0221528 | A1 | 8/2016 | Sugimura et al. | |

FOREIGN PATENT DOCUMENTS

| | | |
|---|---|---|
| JP | 2015-085768 A | 5/2015 |
| JP | 2016120794 A * | 7/2016 |
| JP | 2017074852 A * | 4/2017 |

* cited by examiner

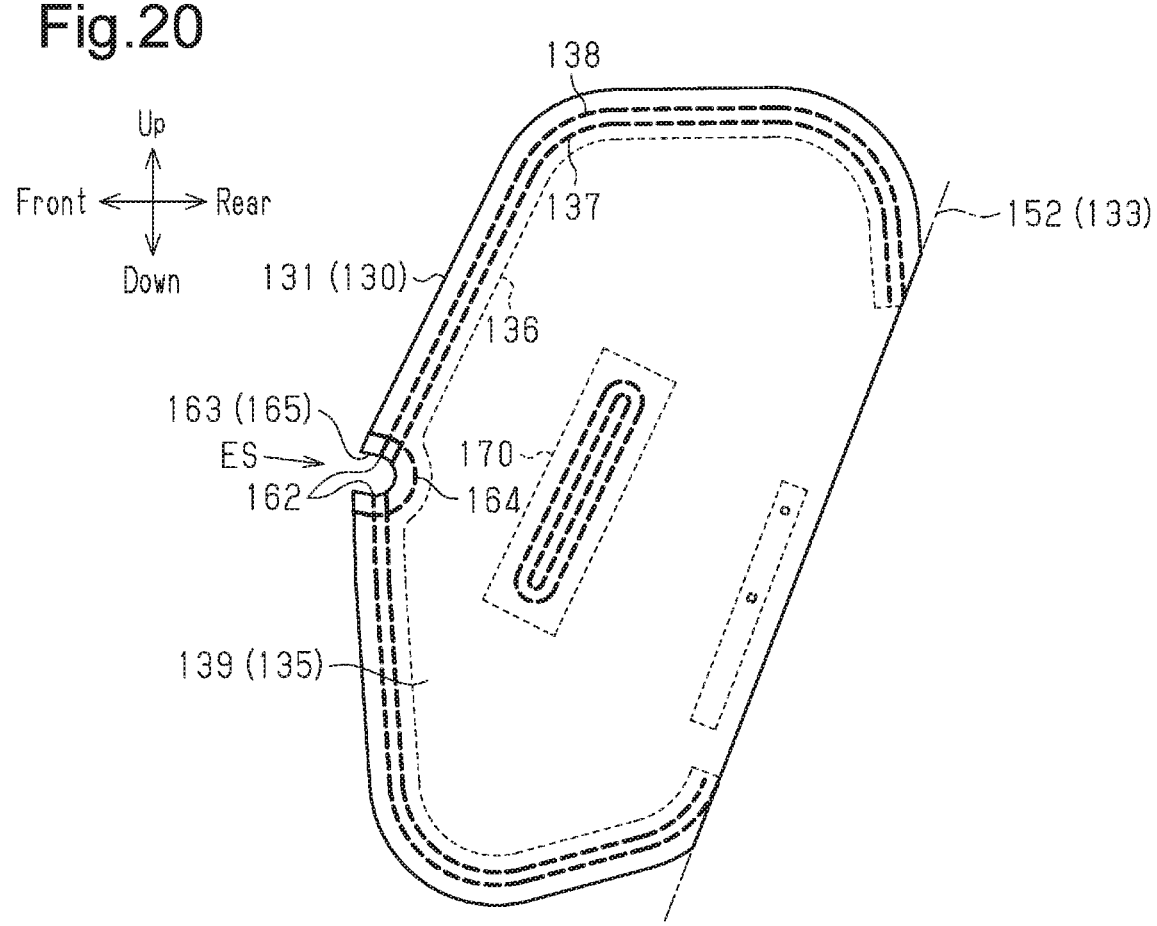

SIDE AIRBAG APPARATUS

BACKGROUND

1. Field

The present disclosure relates to a side airbag apparatus that is mounted in a vehicle and protects an occupant from an impact due to a collision to the vehicle from the side.

2. Description of Related Art

This type of side airbag apparatus includes an airbag that is deployed and inflated between a body side portion of a vehicle and an occupant seated in a seat in a passenger compartment. For example, as disclosed in US Patent Application Publication No. 2015/0097359, some side airbag apparatuses include two airbags that are continuous with each other through a connecting hole and adjacent to each other in a vehicle width direction. In this case, an inflator, which generates gas, is arranged in one of the airbags. Thus, gas in one airbag is supplied to the other airbag through the connecting hole.

Since the two airbags are inflated to be adjacent to each other in the vehicle width direction in the above-described side airbag apparatus, the position of the connecting hole for connecting the two airbags is limited.

SUMMARY

Accordingly, it is an objective of the present disclosure to provide a side airbag apparatus that increases the degree of flexibility in the position of a connecting hole in an inner bag.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

To achieve the foregoing objective and in accordance with a first aspect of the present disclosure, a side airbag apparatus including an airbag is provided. The airbag is configured to be deployed and inflated between a body side portion of a vehicle and an occupant seated in a seat in a passenger compartment by a pressure of gas supplied from an inflator. The airbag includes an outer bag and an inner bag that is provided inside the outer bag and accommodates the inflator. The inner bag includes an upper-side inflation portion, which is configured to project forward when inflated to correspond to a shoulder of the occupant, a lower-side inflation portion, which is configured to project forward when inflated to correspond to a lumbar region of the occupant, and a recessed portion provided between the upper-side inflation portion and the lower-side inflation portion. The inner bag includes at least one connecting hole that connects an inside and an outside of the inner bag to each other.

To achieve the foregoing objective and in accordance with a second aspect of the present disclosure, a vent structure for an airbag is provided. The airbag has an inflation portion. The inflation portion is formed by sewing peripheral portions of two fabric portions overlapped with each other in a thickness direction by a peripheral sewn portion. The inflation portion is configured to be inflated by inflation gas. The peripheral sewn portion includes a section in which sewing is absent. The absence of sewing provides the peripheral sewn portion with two sewing ends that are separated from each other. A notch is provided in a section in the peripheral portion of each fabric portion. The notch extends into a region surrounded by the peripheral sewn portion through and between the sewing ends. Each fabric portion has a vent reinforcing sewn portion that reinforces at least part of a section of the fabric portions that surrounds the notch. The vent reinforcing sewn portion of each fabric portion is located on an opposite side of one of the sewing ends from the notch and intersects with the peripheral sewn portion.

Other features and aspects will be apparent from the following detailed description, the drawings, and the claims.

BRIEF DESCRIPTION OF THE DRAWINGS

FIG. 20 is a side view of an airbag module according to a modification in which a vent structure is provided in a body inflation portion of an airbag body.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A side airbag apparatus 11 according to a first embodiment of the present disclosure will now be described with reference to FIGS. 1 to 7. In the following description, upward, downward, forward, rearward, inward, outward directions are defined as illustrated in FIGS. 1 to 3.

Figure 1:
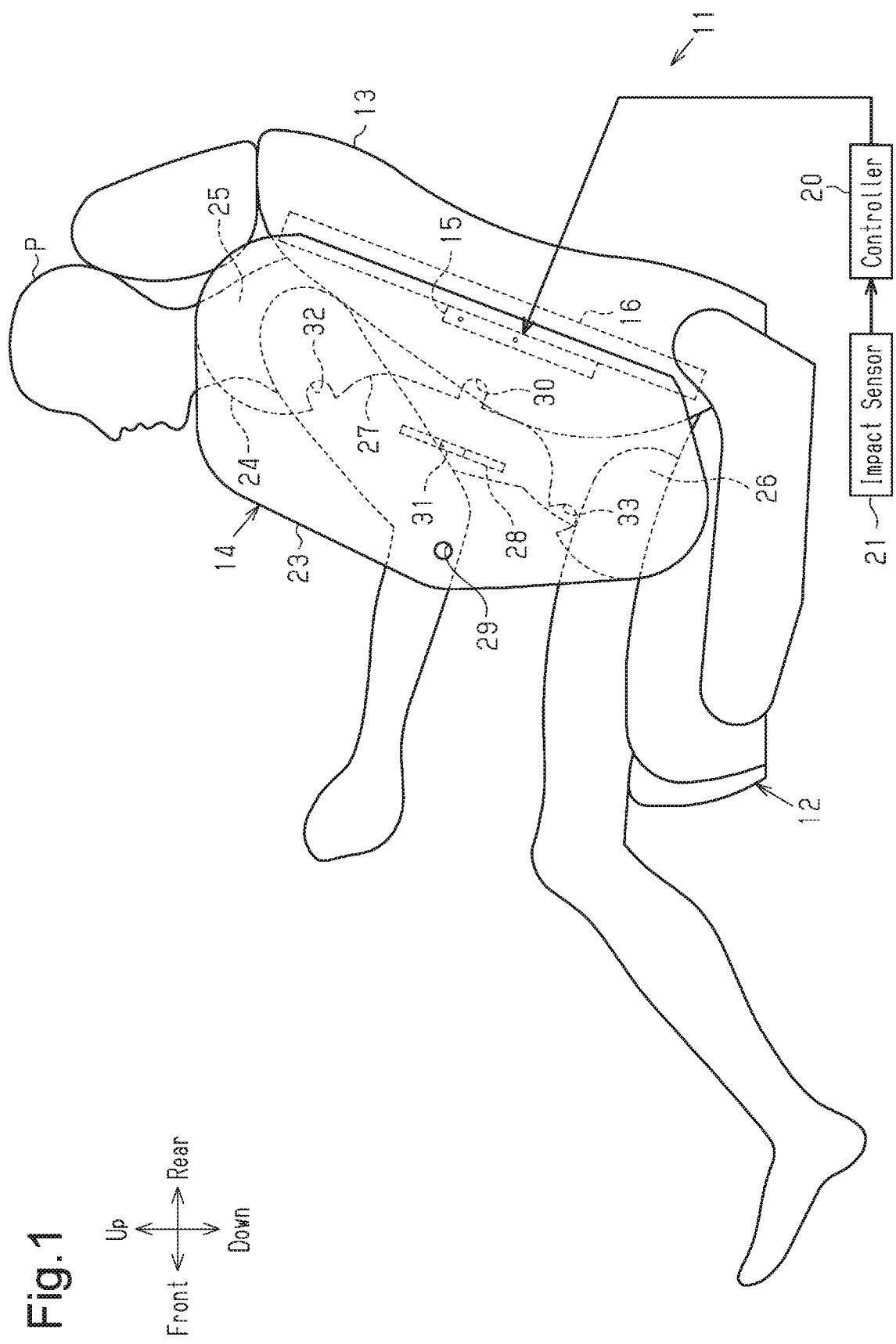
FIG. 1 is a side view of an entire side airbag apparatus according to a first embodiment of the present disclosure, illustrating a state in which an airbag is inflated.

As shown in FIG. 1, the side airbag apparatus 11 includes an airbag 14 and an inflator 15. The airbag 14 is folded and accommodated in a backrest 13 of a seat 12 in a passenger compartment. The inflator 15 is configured to supply inflation gas to the airbag 14. The inflator 15 is fixed to a frame 16 in the backrest 13 together with the airbag 14.

Figure 2:
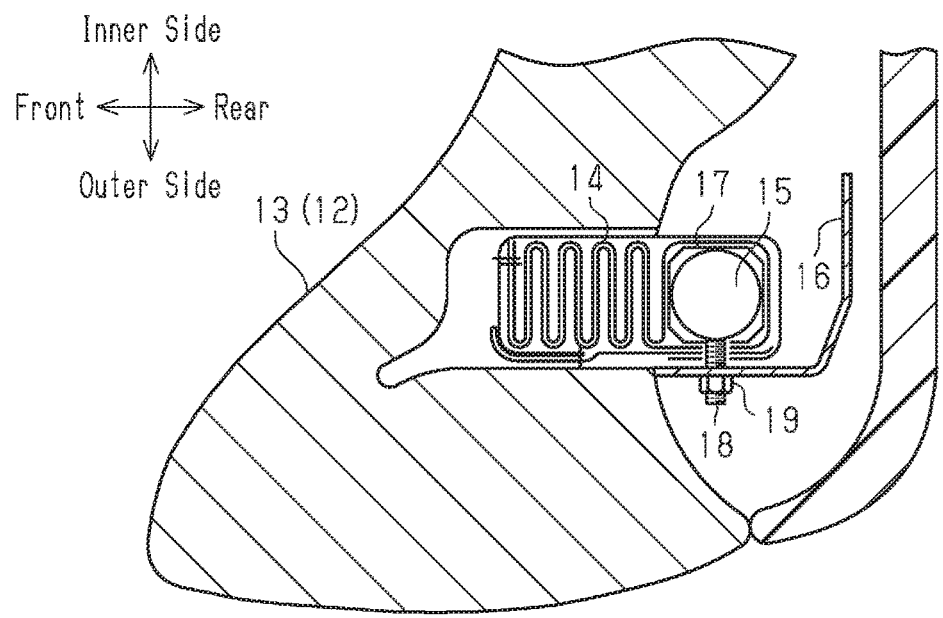
FIG. 2 is an enlarged cross-sectional view showing a structure inside a backrest that includes the airbag.
Figure 3:
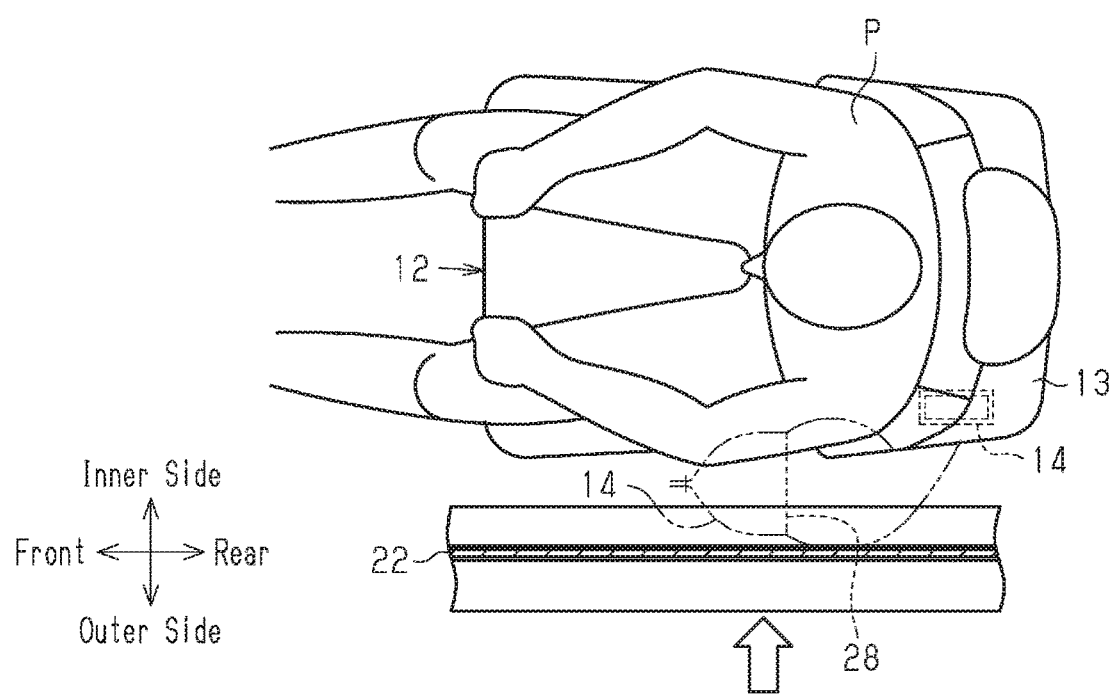
FIG. 3 is a plan view showing the positional relationship of a seat and a body side portion in a vehicle.

As shown in FIG. 2, the inflator 15, which is accommodated inside the backrest 13, is fixed to a retainer 17 by swaging. The retainer 17 surrounds the inflator 15. The retainer 17 is fixed to the inner side of the frame 16 together with the airbag 14 in a folded state by a bolt 18 and a nut 19. That is, the retainer 17, to which the inflator 15 is fixed, is fixed to the inner side of the frame 16 together with the airbag 14.

As shown in FIG. 1, the side airbag apparatus 11 includes a controller 20 and an impact sensor 21. The controller 20 controls supply of inflation gas to the airbag 14 by the inflator 15. The impact sensor 21 is configured to detect a side collision to the vehicle. When an impact due to a side collision is applied to the vehicle, the impact sensor 21 outputs a detection signal to the controller 20. Based on the detection signal from the impact sensor 21, the controller 20 activates the inflator 15 to supply inflation gas to the airbag 14.

When the inflator 15 supplies inflation gas to the airbag 14 in a folded state, the pressure of the gas deploys and inflates the airbag 14, so that the airbag 14 projects forward with the section near the inflator 15 remaining in the backrest 13. After projecting from the backrest 13, the airbag 14 is deployed and inflated forward in a space between an occupant P seated in the seat 12 and a body side portion 22, which includes a door and a pillar of the vehicle, as indicated by the long dashed double-short dashed lines in FIG. 3.

The airbag 14 in a deployed and inflated state has a size capable of protecting a region ranging from the thorax to the lumbar region of the occupant P. The airbag 14 is thus deployed and inflated to correspond to the region ranging from the thorax to the lumbar region of the occupant P. In this case, the occupant P, who is seated in the seat 12, has a size equivalent to a crash test dummy. The crash test dummy is, for example, the AM50 (the model that covers 50% of the American adult male population) of the WorldSID program.

The outline arrow in FIG. 3 indicates the direction of an impact applied to the body side portion 22 due to a side collision to the vehicle.

The structure of the airbag 14 will be now described.

As shown in FIG. 1, the airbag 14 includes an outer bag 23 and an inner bag 24, which is provided in a rear section of the outer bag 23 and accommodates the inflator 15. The entire inner bag 24 is substantially shaped like the letter C with the front side opened. The inner bag 24 includes an upper-side inflation portion 25, which projects forward when inflated to correspond to the shoulder of the occupant P, a lower-side inflation portion 26, which projects forward when inflated to correspond to the lumbar region of the occupant P, and a recessed portion 27, which is provided between the upper-side inflation portion 25 and the lower-side inflation portion 26.

The inflator 15 is covered with a flow regulating member (not shown), which is a tubular piece of fabric, in the inner bag 24. The flow regulating member is configured to preferentially conduct the inflation gas supplied from the inflator 15 to the upper-side inflation portion 25 and the lower-side inflation portion 26 in the inner bag 24.

A vehicle width direction, which matches a lateral direction, is defined as a thickness direction of the outer bag 23. The inner surfaces in the thickness direction of the outer bag 23 are coupled to each other by a tether 28, which is a rectangular piece of fabric. The tether 28 limits the thickness of the outer bag 23. When the airbag 14 is inflated, the tether 28 extends through the recessed portion 27 to limit the thickness of the outer bag 23. The outer bag 23 has left and right two vent holes 29, which are configured to discharge gas in the airbag 14 to the outside, in a center section at the front end.

The inner bag 24 has a center connecting hole 30 in a center section of the recessed portion 27. The center connecting hole 30 connects the inside and the outside of the inner bag 24 to each other to be opposed to the tether 28 in the front-rear direction when the airbag 14 is inflated. The tether 28 has a through-hole 31 at a position that is opposed to the center connecting hole 30 in the front-rear direction when the airbag 14 is inflated.

The inner bag 24 has an upper-side connecting hole 32 in an upper section of the recessed portion 27. The upper-side connecting hole 32 faces forward and diagonally downward when the inner bag 24 is inflated and connects the inside and the outside of the inner bag 24 to each other. The inner bag 24 also has a lower-side connecting hole 33 in a lower section of the recessed portion 27. The lower-side connecting hole 33 faces forward and diagonally upward when the inner bag 24 is inflated and connects the inside and the outside of the inner bag 24 to each other.

The upper-end peripheral portion of the upper-side inflation portion 25 and the lower-end peripheral portion of the lower-side inflation portion 26 in the inner bag 24 are respectively sewn and fixed to the upper-end peripheral portion and the lower-end peripheral portion of the outer bag 23.

A method for manufacturing the airbag 14 will now be described.

When manufacturing the airbag 14, a single outer-side base fabric piece 34 (refer to FIG. 4), which is used to form the outer bag 23, a single inner-side base fabric piece 35 (refer to FIG. 5), which is used to form the inner bag 24, and the single tether 28 (refer to FIG. 6), which is a fabric piece.

Figure 6:
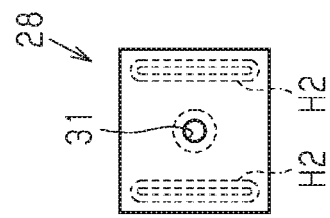
FIG. 6 is a developed view of a tether.
Figure 5:
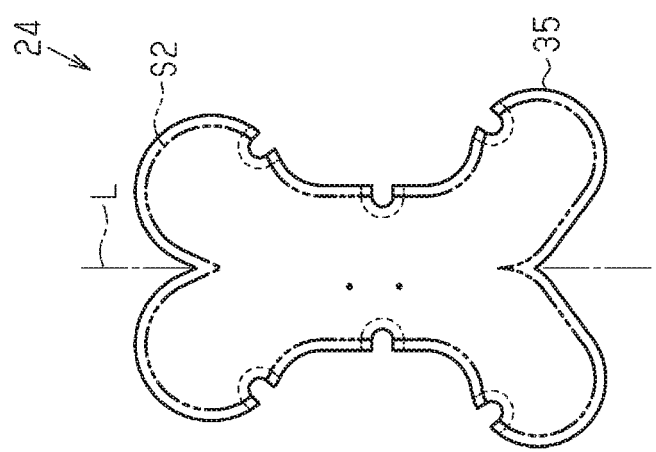
FIG. 5 is a developed view of an inner bag.
Figure 4:
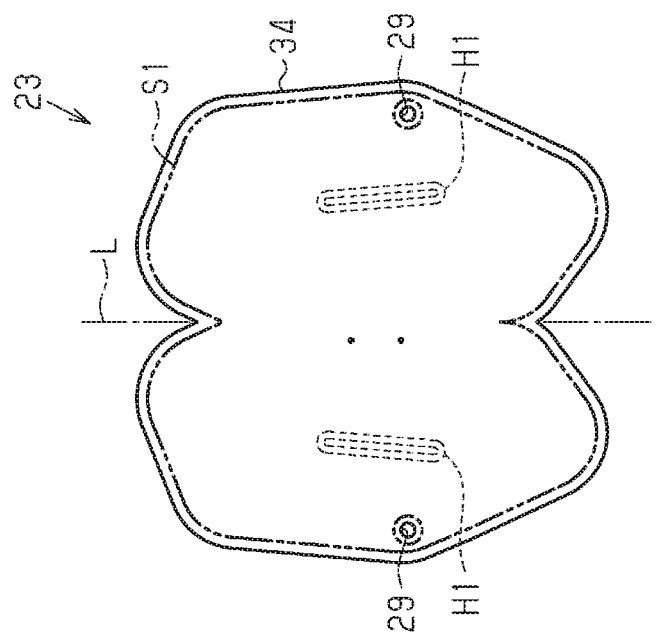
FIG. 4 is a developed view of an outer bag.

A long dashed double-short dashed line S1 at the periphery of the single outer-side base fabric piece 34 in FIG. 4 represents a peripheral sewn portion. When forming the outer bag 23, the single outer-side base fabric piece 34 is folded in half along a folding line L to be overlapped with itself, and the overlapped sections of the peripheral sewn portion are sewn together. Two double broken lines H1, which are substantially shaped like oblong circles, on the single outer-side base fabric piece 34 in FIG. 4 and two double broken lines H2, which are substantially shaped like oblong circles, on the tether 28 in FIG. 6 are sewn portions, which are sewn to and coupled to each other. A long dashed double-short dashed line S2 at the periphery of the inner-side base fabric piece 35 in FIG. 5 represents a peripheral sewn portion. When forming the inner bag 24, the single inner-side base fabric piece 35 is folded in half along a folding line L to be overlapped with itself, and the overlapped sections of the peripheral sewn portion are sewn together.

Figure 7:
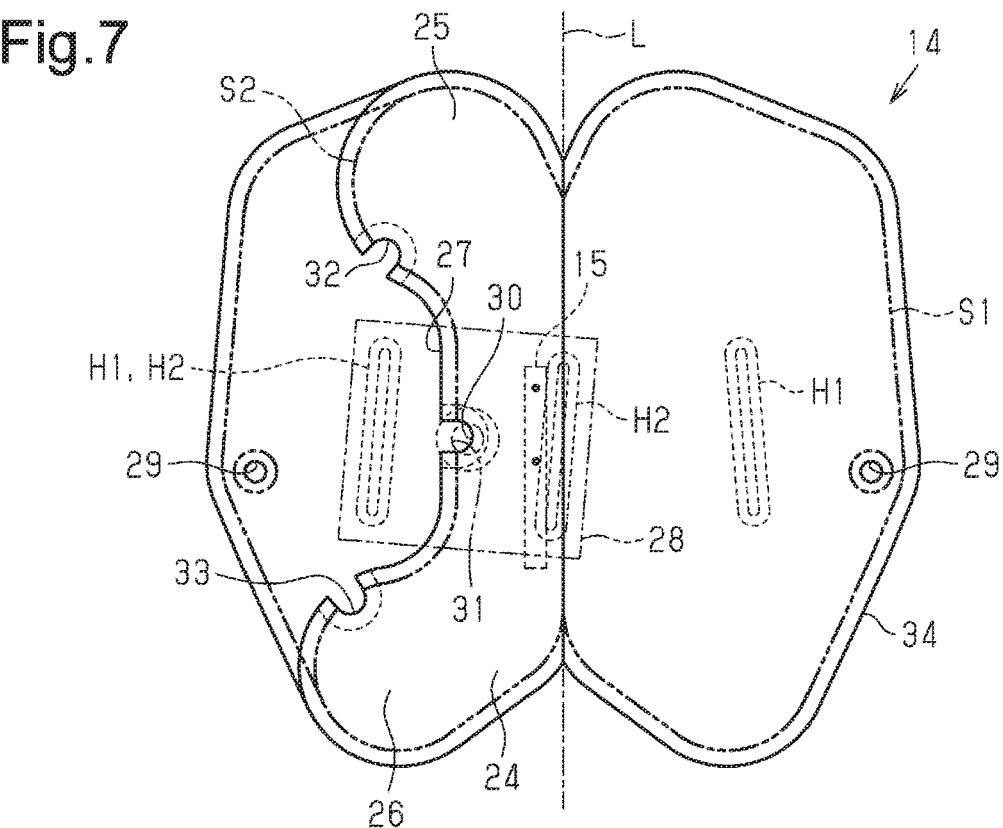
FIG. 7 is a developed view of the airbag.

Subsequently, as shown in FIG. 7, the single inner-side base fabric piece 35 is placed on the single outer-side base fabric piece 34 such that the folding lines L match. Next, the inflator 15 is arranged on the single inner-side base fabric piece 35 to extend along the folding line L. In this state, the single inner-side base fabric piece 35 is folded in half so as to be overlapped with itself. The overlapped halves of the inner-side base fabric piece 35 are sewn together along the long dashed double-short dashed line S2 to form the inner bag 24.

Subsequently, the sections in the tether 28 that are indicated by the two double broken lines H2 and the sections in the single outer-side base fabric piece 34 that are indicated by the two double broken lines H1 are sewn together. Next, the single outer-side base fabric piece 34 is folded in half along the folding line L to be overlapped with itself. The overlapped halves of the outer-side base fabric piece 34 are sewn together along the long dashed double-short dashed line S1 to form the outer bag 23.

At this time, the outer bag 23 and the inner bag 24 are sewn together in a section where the long dashed double-short dashed line S1 of the outer bag 23 (the outer-side base fabric piece 34) and the long dashed double-short dashed line S2 of the inner bag 24 (the inner-side base fabric piece 35) overlap with each other. That is, the upper-end peripheral portion of the upper-side inflation portion 25 and the lower-end peripheral portion of the lower-side inflation portion 26 in the inner bag 24 are respectively fixed to the upper-end peripheral portion and the lower-end peripheral portion of the outer bag 23. The airbag 14 is thus completed.

An operation of the side airbag apparatus 11 according to the first embodiment will now be described.

When an impact due to a side collision is applied to the vehicle, inflation gas from the inflator 15 is supplied to the airbag 14, which is folded inside the backrest 13, so that the airbag 14 is deployed and inflated. In this case, since the inflator 15 is arranged in the inner bag 24 while being covered with the flow regulating member, the inflation gas discharged from the inflator 15 is preferentially conducted to the upper-side inflation portion 25 and the lower-side inflation portion 26 in the inner bag 24.

Thus, the pressure of the gas discharged form the inflator 15 first deploys and inflates the upper-side inflation portion 25 and the lower-side inflation portion 26 in the inner bag 24. At this time, since the upper-side inflation portion 25 and the lower-side inflation portion 26 are fixed to the outer bag 23, vertical swing is limited. This allows the upper-side inflation portion 25 and the lower-side inflation portion 26 to be accurately inflated at positions respectively corresponding to the shoulder and the lumbar region of the occupant P.

Accordingly, the impact due to the side collision is first received by the shoulder and the lumbar region, which have a relatively high impact resistance in the body of the occupant P. That is, the shoulder and the lumbar region, which have a relatively high impact resistance in the body of the occupant P, are reliably restrained and protected by the inner bag 24. When the gas fills the inner bag 24 so that the entire inner bag 24 is inflated, the gas in the inner bag 24 is discharged through the center connecting hole 30, the upper-side connecting hole 32, and the lower-side connecting hole 33. The pressure of the discharged gas inflates the outer bag 23.

Since the tether 28 is deployed together with the inflation of the outer bag 23, the thickness of the outer bag 23 is limited by the tether 28. At this time, the tether 28 extends through the recessed portion 27 of the inner bag 24, so as not to contact the inner bag 24. Thus, the deployment of the tether 28 is not hampered by the inner bag 24.

Also, the tether 28, which is located in front of the center connecting hole 30, has the through-hole 31. Thus, the gas that is discharged forward from the center connecting hole 30 flows through the tether 28 via the through-hole 31. Therefore, the supply of gas to the outer bag 23 via the center connecting hole 30 from the inner bag 24 is unlikely to be hampered by the tether 28.

Also, due to the orientations of the center connecting hole 30, the upper-side connecting hole 32, and the lower-side connecting hole 33, the flows of gas discharged from these holes 30, 32, 33 congregate in the center portion in the outer bag 23, which corresponds to the inside of the recessed portion 27 of the inner bag 24 and the section in front of the recessed portion 27. Accordingly, the center portion of the outer bag 23 is inflated quickly.

The center portion of the outer bag 23, in which the flows of gas discharged from the center connecting hole 30, the upper-side connecting hole 32, and the lower-side connecting hole 33 congregate, correspond to the rib region, which has a relatively low impact resistance in the body of the occupant P. Therefore, by preferentially inflating the center portion of the outer bag 23 after the inner bag 24 is inflated, the rib region of the occupant P is gently restrained by the outer bag 23 so as to be preferentially protected. After the outer bag 23 is inflated, the gas in the outer bag 23 (the airbag 14) is discharged to the outside through the vent holes 29.

The first embodiment has the following advantages.

(1) The side airbag apparatus 11 includes the airbag 14, which is deployed and inflated in the space between the body side portion 22 of the vehicle and the occupant P seated in the seat 12 by the pressure of the gas supplied from the inflator 15. The airbag 14 includes the outer bag 23 and the inner bag 24, which is provided in the outer bag 23 and accommodates the inflator 15. The inner bag 24 has the center connecting hole 30, the upper-side connecting hole 32, and the lower-side connecting hole 33, which connect the inside and the outside of the inner bag 24 to each other. With this configuration, the inner bag 24 being arranged in the outer bag 23 increases the degree of flexibility in the positions of the center connecting hole 30, the upper-side connecting hole 32, and the lower-side connecting hole 33 in the inner bag 24. This increases the degree of flexibility in design of the airbag 14, and thus increases the degree of the flexibility in design of the side airbag apparatus 11.

(2) The inner surfaces in the thickness direction of the outer bag 23 are coupled to each other by the tether 28, which limits the thickness of the outer bag 23. The tether 28 extends through the recessed portion 27 when the airbag 14 is inflated. This configuration limits the thickness of the outer bag 23 by using the tether 28, while preventing the tether 28 and the inner bag 24 from contacting each other.

(3) The inner bag 24 has the center connecting hole 30 in the center section of the recessed portion 27. The center connecting hole 30 is opposed to the tether 28 in the front-rear direction when the airbag 14 is inflated. Also, the tether 28 has the through-hole 31 at a position that is opposed to the center connecting hole 30 in the front-rear direction when the airbag 14 is inflated. With this configuration, when the airbag 14 is inflated, the gas in the inner bag 24 that is discharged from the center connecting hole 30 is supplied to the inside of the outer bag 23 via the through-hole 31 of the tether 28. Therefore, the supply of gas to the outer bag 23 via the center connecting hole 30 from the inner bag 24 is unlikely to be hampered by the tether 28.

(4) The inner bag 24 has the upper-side connecting hole 32 in the upper section of the recessed portion 27, and the upper-side connecting hole 32 is oriented forward and diagonally downward when the inner bag 24 is inflated. The inner bag 24 also has the lower-side connecting hole 33 in a lower section of the recessed portion 27. The lower-side connecting hole 33 faces forward and diagonally upward when the inner bag 24 is inflated. With this configuration, when the airbag 14 is inflated, the flows of the gas in the inner bag 24 discharged from the upper-side connecting hole 32 and the lower-side connecting hole 33 congregate in the center portion of the outer bag 23, which corresponds to the recessed portion 27 and the section in front of the recessed portion 27. Accordingly, the center portion of the outer bag 23 is inflated quickly. This preferentially protects the region in the body of the occupant P that corresponds to the center portion of the outer bag 23, in which the flows of gas discharged from the holes congregate.

(5) The upper-side inflation portion 25 and the lower-side inflation portion 26 of the inner bag 24 are fixed to the outer bag 23. This configuration limits swing of the upper-side inflation portion 25 and the lower-side inflation portion 26, particularly in the vertical direction, when the inner bag 24 is inflated.

Second Embodiment

A side airbag apparatus 11 according to a second embodiment of the present disclosure will now be described with reference to FIGS. 8 to 13. Like or the same reference numerals are given to those components in the second embodiment that are like or the same as the corresponding components of the first embodiment.

Figure 8:
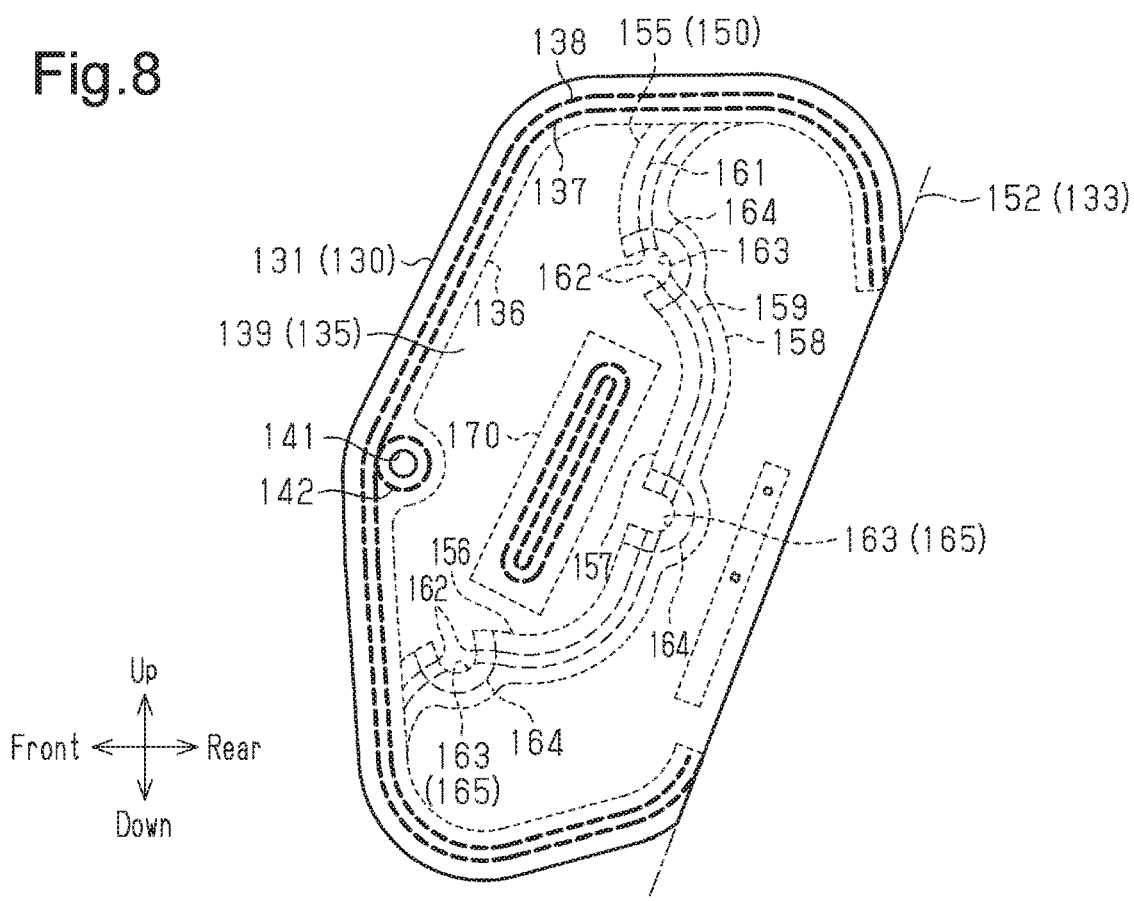
FIG. 8 is a side view of an airbag module according to a second embodiment of the present disclosure.
Figure 9:
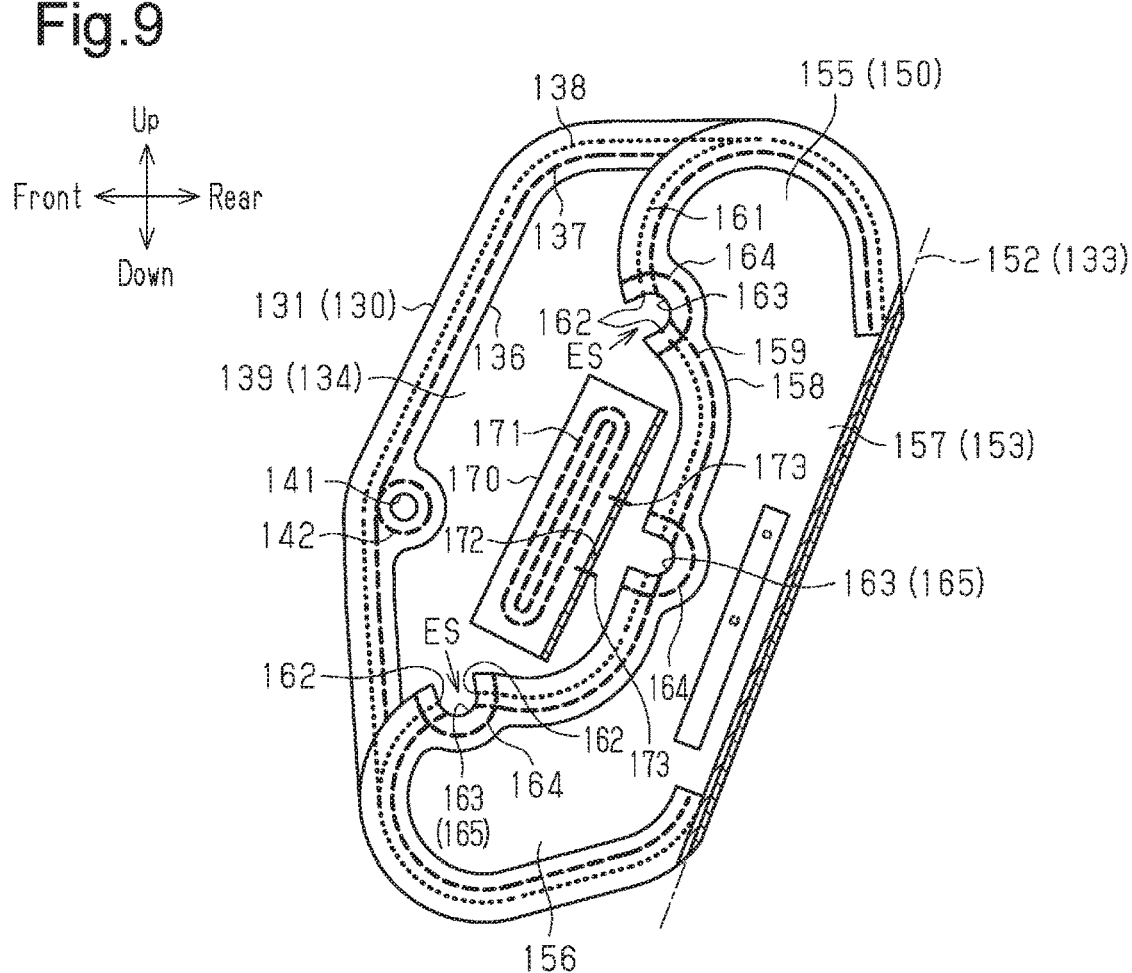
FIG. 9 is a cross-sectional side view illustrating the inner structure of the airbag module.
Figure 11:
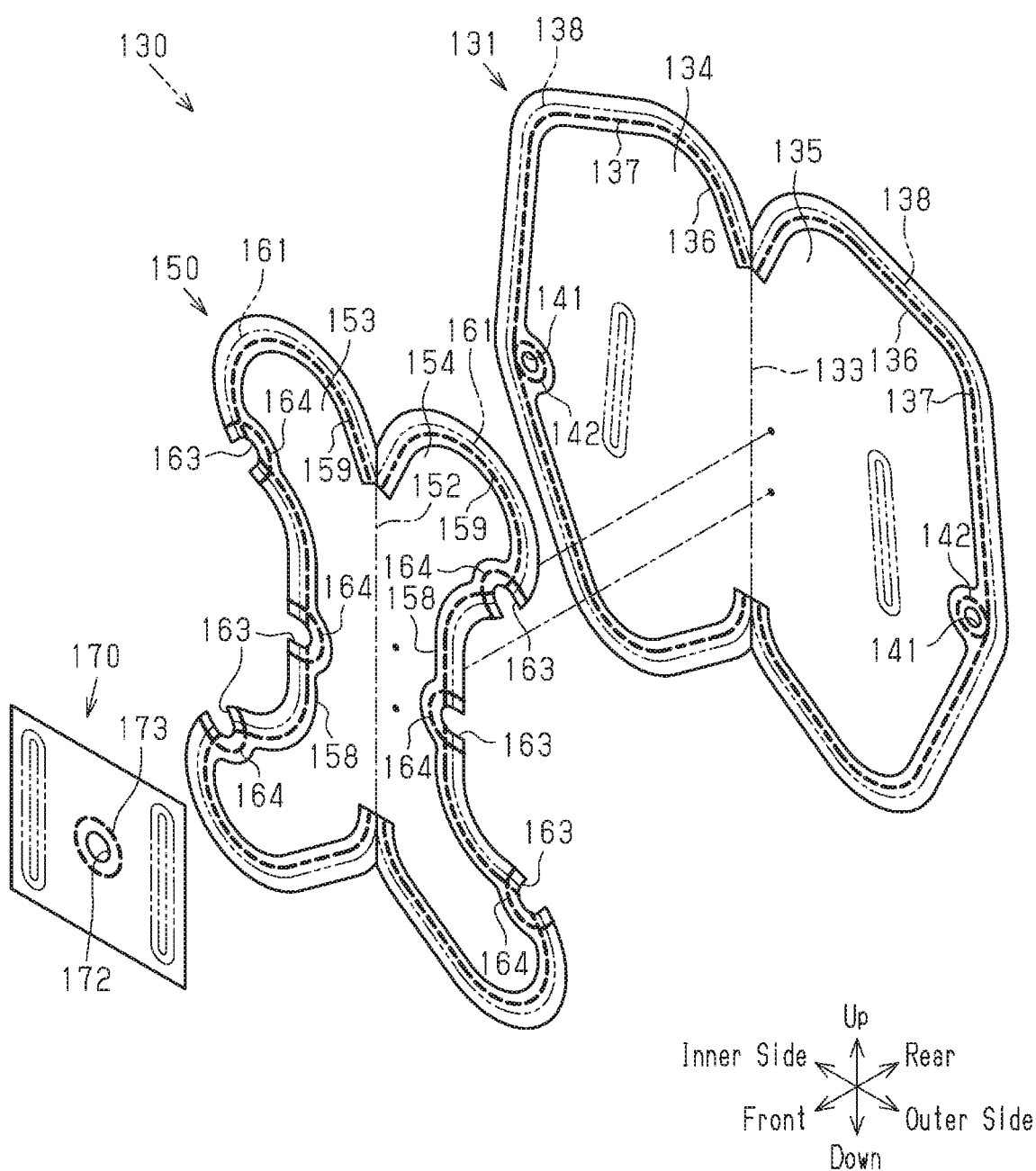
FIG. 11 is an exploded perspective view of components of the airbag.

As shown in FIGS. 8, 9, and 11, an airbag 130 includes an airbag body 131, an inner bag 150, and a tether 170.

A band-shaped body reinforcing fabric piece 136 is overlapped with a peripheral portion of each of the body fabric portions 134, 135 except for the rear end (the section in the vicinity of a folding line 133). The body fabric portions 134, 135 and the body reinforcing fabric pieces 136 are joined together by a body reinforcing sewn portion 137, which is provided along the body reinforcing fabric pieces 136. The body reinforcing sewn portion 137 is formed by sewing the body reinforcing fabric pieces 136 and the body fabric portions 134, 135 with sewing threads. The peripheral portions of the respective body fabric portions 134, 135 are reinforced by the body reinforcing fabric pieces 136 and the body reinforcing sewn portion 137.

The body fabric portions 134, 135, to which the body reinforcing fabric pieces 136 are sewn as described above, are joined to each other by a body peripheral sewn portion 138, which is provided along large parts of the peripheral portions of the body reinforcing fabric pieces 136 and the body fabric portions 134, 135. The body peripheral sewn portion 138 is formed by sewing the peripheral portions of the body reinforcing fabric pieces 136 and the body fabric portions 134, 135 except for the rear end.

Sewn portions in FIGS. 8 to 11 and 13 are represented by three types of lines. The same applies to FIGS. 19 and 20, which show modifications. The first type of line includes thick line segments of a certain length arranged intermittently (a type of broken line) and represents a sewn portion as seen from the side (for example, refer to the body reinforcing sewn portion 137 and the body peripheral sewn portion 138 in FIG. 8). The second type of line includes thin line segments of a certain length (longer than a typical broken line) arranged intermittently (a type of broken line) and represents the state of sewing threads that are located behind the body fabric portions 134, 135 and cannot be seen directly (for example, refer to an inner reinforcing sewn portion 159, an inner peripheral sewn portion 161, and vent reinforcing sewn portions 164). The third type of line includes dots arranged at predetermined intervals (a type of a broken line) and represents the state of sewing threads at a position between the body fabric portions 134, 135, which are the target of sewing (for example, refer to the body peripheral sewn portion 138 and the inner peripheral sewn portion 161 in FIG. 9). That is, diagrams depicted with the third type of line show the structure along the cross-section that passes through the sewn portions.

As shown in FIGS. 8 and 9, the space between the body fabric portions 134, 135 surrounded by the body peripheral sewn portion 138 is included in a body inflation portion 139, which is deployed and inflated by inflating gas.

The body fabric portions 134, 135 and the body reinforcing fabric pieces 136 each have a vent hole 141 in a front portion. Each vent hole 141 connects the inside and the outside of the body inflation portion 139 to each other. The vent holes 141 are configured to discharge excess inflation gas in the body inflation portion 139 to the outside. The body reinforcing fabric pieces 136 and the body fabric portions 134, 135 are sewn together by an annular vent reinforcing sewn portion 142 provided about each vent hole 141. The vent holes 141 are reinforced by the body reinforcing fabric pieces 136 and the vent reinforcing sewn portions 142.

Figure 12:
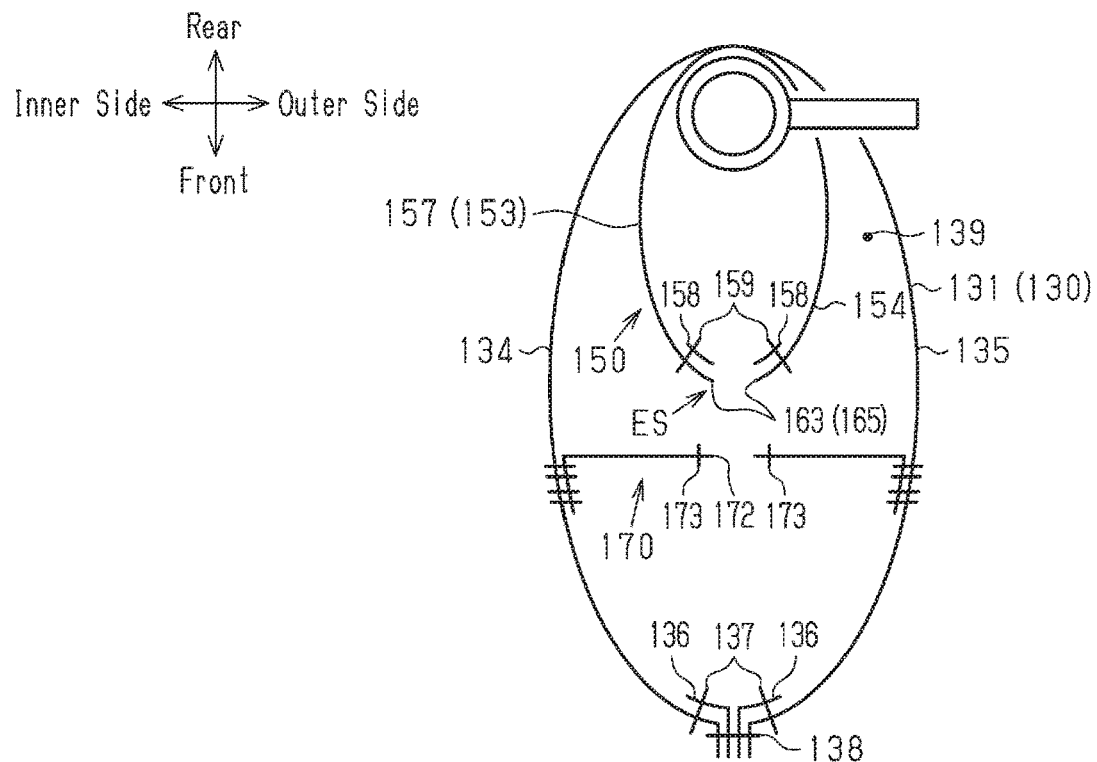
FIG. 12 is a schematic cross-sectional plan view of the airbag in a deployed and inflated state.

As shown in FIGS. 9, 11, and 12, a band-shaped inner reinforcing fabric piece 158 is overlapped with the peripheral portion of each of inner fabric portions 153, 154 except for the rear end (the section in the vicinity of a folding line 152). The inner fabric portions 153, 154 and the inner reinforcing fabric pieces 158 are joined together by the inner reinforcing sewn portion 159, which is provided along the inner reinforcing fabric pieces 158. The inner reinforcing sewn portion 159 is formed by sewing the inner reinforcing fabric pieces 158 and the inner fabric portions 153, 154. The peripheral portions of the inner fabric portions 153, 154 are reinforced by the inner reinforcing fabric pieces 158 and the inner reinforcing sewn portion 159.

The inner fabric portions 153, 154, to which the inner reinforcing fabric pieces 158 are sewn as described above, are joined to each other by the inner peripheral sewn portion 161, which is provided along large parts of the inner reinforcing fabric pieces 158 and the inner fabric portions 153, 154. The inner peripheral sewn portion 161 corresponds to a peripheral sewn portion. The inner peripheral sewn portion 161 is formed by sewing the peripheral portions of the inner reinforcing fabric pieces 158 and the inner fabric portions 153, 154 except for the rear end.

As shown in FIG. 9, an upper inflation portion 155, a lower inflation portion 156, and an intermediate inflation portion 157 are each provided with a vent structure ES for inflation gas. The vent structures ES have the same structure.

Figure 13:
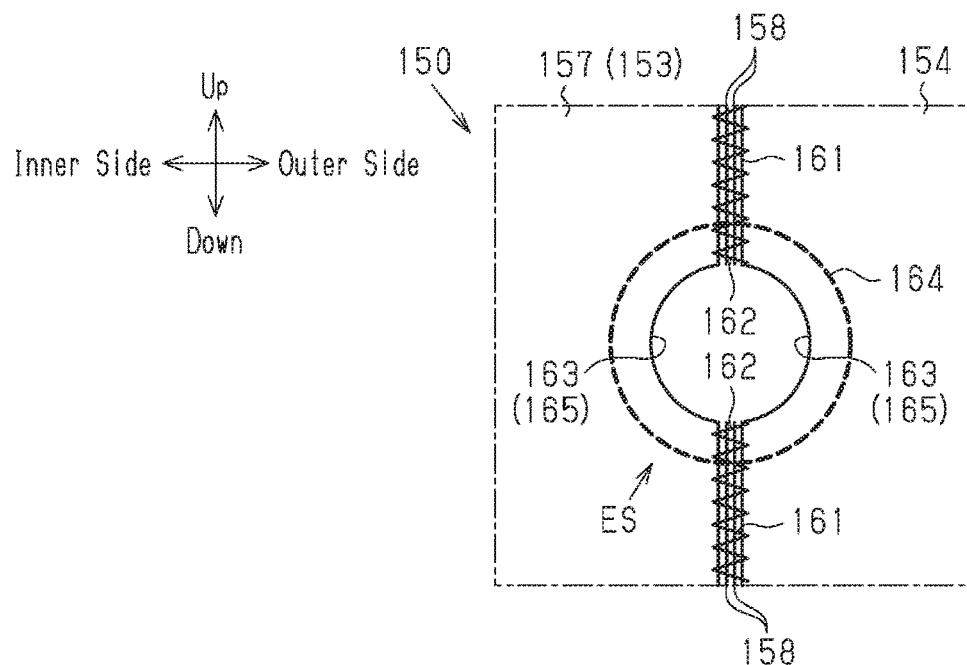
FIG. 13 is a partial front view of the vent structure.

As shown in FIGS. 11 and 13, each vent structure ES has a section of the inner peripheral sewn portion 161 in which sewing is absent and a section of the inner reinforcing sewn portion 159 in which sewing is absent. The absence of sewing provides the inner peripheral sewn portion 161 with two sewing ends 162, which are separated from each other. The inner fabric portions 153, 154 and the inner reinforcing fabric pieces 158 each have notches 163. The notches 163 are located in some sections in the peripheral portions of the inner fabric portions 153, 154 and the corresponding sections in the inner reinforcing fabric pieces 158. Each notch 163 extends from the outer edges of the inner fabric portions 153, 154 and the inner reinforcing fabric pieces 158 and into the region surrounded by the inner peripheral sewn portion 161 through and between the sewing ends 162. The notches 163 of the inner fabric portions 153, 154 are open in the outer edges of the inner fabric portions 153, 154 and have semicircular shapes. The parts of the notches 163 on the inner side of the sewing ends 162 form a vent hole 165, which connects the inside and the outside of the inner bag 150 to each other to discharge inflation gas in the inner bag 150 to the outside.

The inner fabric portions 153, 154 have the vent reinforcing sewn portions 164, which reinforce the sections surrounding the notches 163. Each vent reinforcing sewn portion 164 of the inner fabric portions 153, 154 has the shape of a line and surrounds the corresponding notches 163. A part of each vent reinforcing sewn portion 164 in each of the inner fabric portions 153, 154 is arcuate along the corresponding notch 163.

Specifically, parts of the inner reinforcing fabric pieces 158 are also overlapped with the peripheral portions of the notches 163. The parts of the inner fabric portions 153, 154 around each notch 163 and the parts of the inner reinforcing fabric pieces 158 that surround the notch 163 are joined together by the corresponding vent reinforcing sewn portion 164 provided along the notches 163. The expression "provided along the notch 163" refers to a state of being provided in a section separated from the notch 163 by a certain distance. Each vent reinforcing sewn portion 164 of the inner fabric portions 153, 154 intersects orthogonally with the inner peripheral sewn portion 161 at a position on the opposite side of the corresponding sewing end 162 from the corresponding notches 163.

The tether 170 includes a through-hole 172 in a section that is in front of the vent hole 165 of the intermediate inflation portion 157. The inflation gas discharged from the vent hole 165 is thus allowed to pass the tether 170 through the through-hole 172. The tether 170 includes an annular reinforcing sewn portion 173, which reinforces the section surrounding the through-hole 172.

An operation of the side airbag apparatus 11 according to the second embodiment will now be described.

As the upper inflation portion 155, the lower inflation portion 156, and the intermediate inflation portion 157 are inflated, the inner fabric portions 153, 154 are pulled toward the opposite sides in the vehicle width direction, or the width direction of the inner fabric portions 153, 154, as shown in FIG. 13. Accordingly, the notches 163 of the inner fabric portions 153, 154 are also pulled in the same directions. When the inner bag 150 is inflated, the notches 163 of the inner fabric portions 153, 154 are open. The parts of the notches 163 on the inner side of the sewing ends 162 function as the vent hole 165, which connects the inside and the outside of the inner bag 150 to each other. When the inner bag 150 is inflated, the parts of the vent holes 165 on the inner sides of the sewing ends 162 are opened to the same degree regardless of the extent of the restraint of the occupant P by the inner bag 150. The shapes of the openings of the vent holes 165 barely change. Thus, the inflation gas in the inner bag 150 is discharged to the body inflation portion 139 outside the inner bag 150 in a stable manner through the vent holes 165, which are opened in the above-described manner. Such discharge of the inflation gas lowers the internal pressure of each of the upper inflation portion 155, the lower inflation portion 156, and the intermediate inflation portion 157. The lowered internal pressure of the inflation portions and the restraint of the occupant P reduce the impact applied to the occupant P, thereby protecting the upper body of the occupant P from the impact.

As described above, the shoulder and the lumbar region of the occupant P have higher impact resistances than the thorax and the abdomen. Thus, high pressures in the upper inflation portion 155, the lower inflation portion 156, and the intermediate inflation portion 157 do not cause any problems. Rather, in a case of such high pressures, the upper body of the occupant P is pushed inward in the vehicle by the upper inflation portion 155 through the shoulder and by the lower inflation portion 156 through the lumbar region. This properly restrains the occupant P, so that the occupant P is protected from the impact.

As the inner bag 150 is inflated as described above, the inner fabric portions 153, 154 are pulled. This may rip the inner peripheral sewn portion 161 shown in FIGS. 10 and 13 from the sewing ends 162. However, the inner peripheral sewn portion 161 is reinforced by the vent reinforcing sewn portions 164, each of which intersects orthogonally with the inner peripheral sewn portion 161 at a position on the opposite side of the corresponding sewing end 162 from the corresponding notches 163. Therefore, even if the inner peripheral sewn portion 161 is ripped, the ripping is stopped by the vent reinforcing sewn portion 164. Accordingly, ripping of the inner peripheral sewn portion 161 is unlikely to reach farther away from the notches 163 than the vent reinforcing sewn portion 164, so that the shape of the vent hole 165 is maintained.

The inner fabric portions 153, 154 are each reinforced by the vent reinforcing sewn portions 164, which have the shapes of lines and are provided to surround the notches 163. Thus, even if the inner fabric portions 153, 154 start being torn from the notches 163 when the inner fabric portions 153, 154 are pulled toward the opposite sides in the vehicle width direction as the inner bag 150 is inflated as described above, the tearing is stopped by the vent reinforcing sewn portions 164. Accordingly, tearing of the inner fabric portions 153, 154 is unlikely to reach farther away from the notches 163 beyond the vent reinforcing sewn portion 164.

Particularly, in the second embodiment, the inner fabric portions 153, 154 are each reinforced by the vent reinforcing sewn portions 164, each of which has the shape of a line and is provided along the corresponding notches 163 in a section separated from the notches 163 by a constant distance. The distance from the notches 163 to the vent reinforcing sewn portion 164 is uniform at any position in the notches 163. Thus, even if the inner fabric portions 153, 154 start being torn from any of the notches 163, the tearing is stopped at the position that is separated from the notches 163 by the same distance.

The second embodiment has the following advantages.

(6) As the inner bag 150 is inflated, the inner fabric portions 153, 154 are pulled toward the opposite sides in the vehicle width direction. Accordingly, the notches 163 of the inner fabric portions 153, 154 are also pulled in the same directions. At this time, if the notches 163 were, for example, rectangular with sharp corners, the stress due to the pulling action would concentrate on the corners. However, in the second embodiment, since the notches 163 of the inner fabric portions 153, 154 have semicircular shapes, the concentration of the stress due to the pulling action is limited.

The above-described embodiments may be modified as follows. The above-described embodiments and the following modifications can be combined as long as the combined modifications remain technically consistent with each other.

Figure 14:
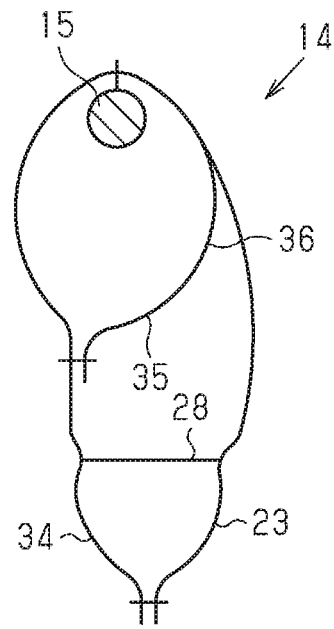
FIG. 14 is a schematic cross-sectional view of an airbag according to a modification.

In the first embodiment, the inner-side base fabric piece 35 shown in FIG. 5 may be cut in half, and the inner bag 36 may be formed by the half of the inner-side base fabric piece 35 and a part of the outer-side base fabric piece 34 as shown in FIG. 14. That is, a part of the inner bag 36 (half in this example) may be provided by a part of the outer bag 23. In this case, the inner-side base fabric piece 35 and the outer-side base fabric piece 34 are preferably provided with gussets to increase the thickness of the inner bag 36. This reduces the size of the inner-side base fabric piece 35 and the number of sewn sections, so that the airbag 14 can be folded into a compact size.

Figure 15:
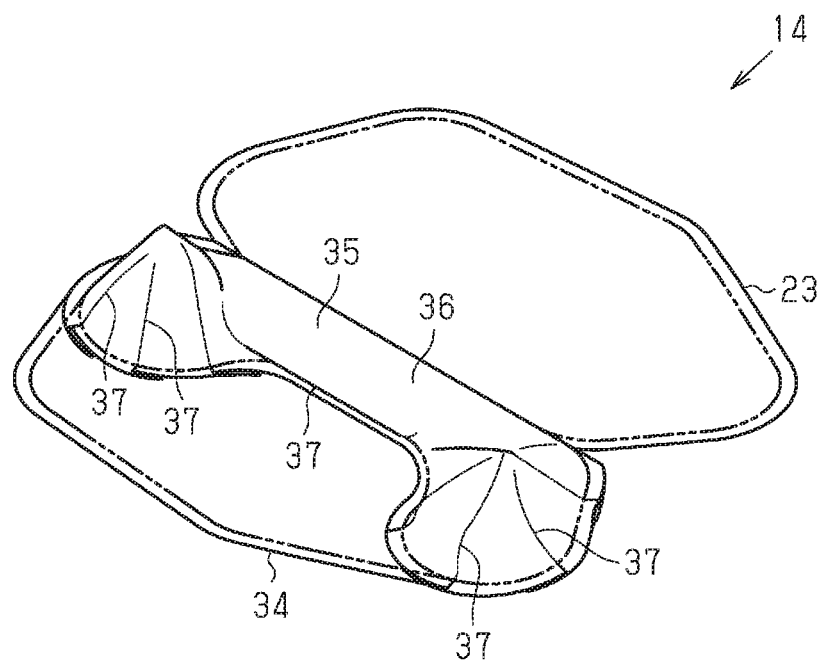
FIG. 15 is a perspective view illustrating a state in which an outer bag of an airbag according to a modification is deployed.
Figure 16:
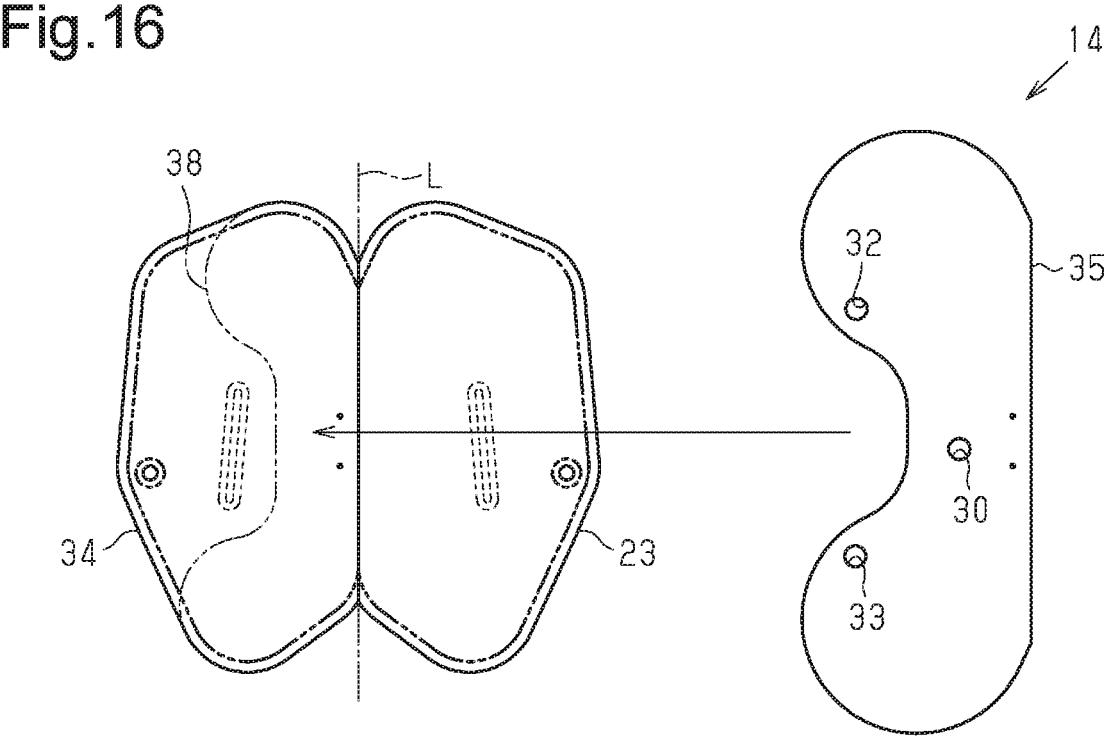
FIG. 16 is a plan view illustrating a method for manufacturing the airbag of FIG. 15.

In the airbag 14 shown FIG. 14, the inner-side base fabric piece 35, which is included in the inner bag 36, may be provided with a tuck 37 as shown FIG. 15. That is, the inner-side base fabric piece 35, which has the tuck 37, may be sewn to a part 38 of the outer-side base fabric piece 34, which forms the outer bag 23. The part 38 of the outer-side base fabric piece 34 is included in the inner bag 36. In this case, a fabric piece that is sufficiently larger than the part 38 is used as the inner-side base fabric piece 35 as shown in FIG. 16. The inner-side base fabric piece 35 is sewn to the part 38 of the outer-side base fabric piece 34, while forming the tuck 37, such that the inner-side base fabric piece 35 becomes baggy. With this configuration, when the inner bag 36 is inflated, the part with the tuck 37 expands to have a protruding shape, thereby further increasing the thickness of the inner bag 36.

Figure 17:
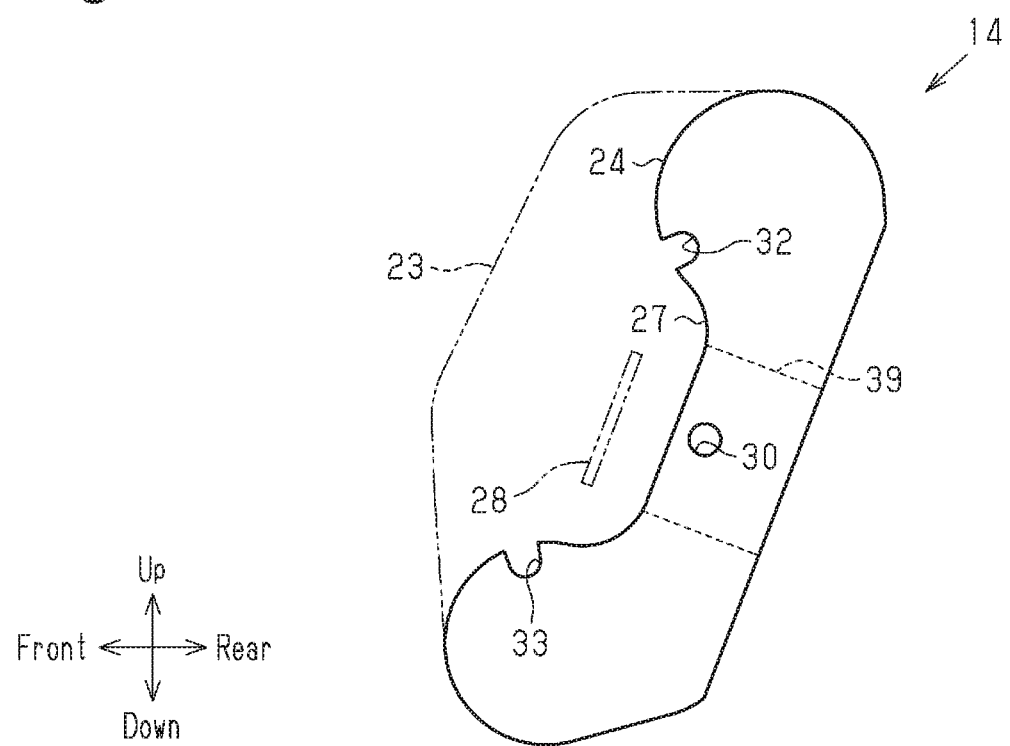
FIG. 17 is a schematic side view of an airbag according to another modification.
Figure 18:
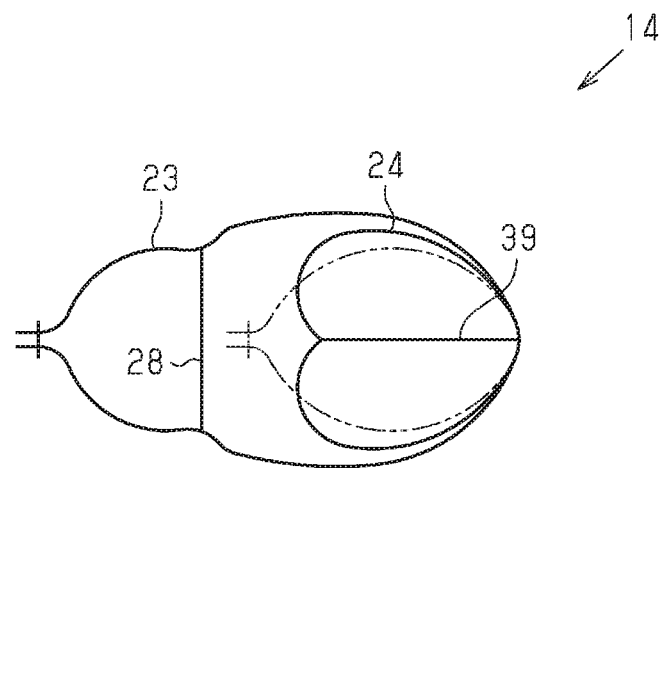
FIG. 18 is a schematic cross-sectional view of the airbag of FIG. 17.

As shown in FIG. 17, the inner bag 24 may be provided with a restriction tether 39, which restricts forward inflation of the inner bag 24, at a position that corresponds to the recessed portion 27 in the inner bag 24. With this configuration, the restriction tether 39 limits forward inflation of the inner bag 24 when the inner bag 24 is inflated. This reduces the thickness of the inner bag 24 in the front-rear direction, while increasing the thickness in the vehicle width direction. The long dashed double-short dashed lines in FIG. 18 represent the inflated state of the inner bag 24 without the restriction tether 39.

The single inner-side base fabric piece 35 may be folded in half along the folding line L to be overlapped with itself, and the peripheral portions of the overlapped halves of the inner-side base fabric piece 35 may be sewn together such that a tuck is formed to form the inner bag 24.

At least one of the upper-side inflation portion 25 and the lower-side inflation portion 26 in the inner bag 24 does not necessarily need to be fixed to the outer bag 23. That is, only one of the upper-side inflation portion 25 and the lower-side inflation portion 26 in the inner bag 24 does not necessarily need to be fixed to the outer bag 23. Alternatively, both of the upper-side inflation portion 25 and the lower-side inflation portion 26 do not necessarily need to be fixed to the outer bag 23.

At least one of the upper-side connecting hole 32 and the lower-side connecting hole 33 in the inner bag 24 may be omitted.

The through-hole 31 of the tether 28 may also be omitted.

The through-hole 31 of the tether 28 and the center connecting hole 30 of the inner bag 24 do not necessarily need to correspond to each other in the front-rear direction.

When the airbag 14 is inflated, the tether 28 does not necessarily need to extend through the recessed portion 27 of the inner bag 24.

The tether 28 may be omitted.

The number, the positions, the sizes, and the shapes of the connecting holes formed in the inner bag 24 may be changed as necessary.

In the second embodiment, the airbag body 131 may be substantially entirely formed by the inflatable body inflation portion 139. Alternatively, the airbag body 131 may include a non-inflation portion, which is neither supplied with inflation gas nor inflated.

The inside of the airbag body 131 (the body inflation portion 139) may be divided into two or more chambers (inflation chambers).

The part of the upper body of the occupant P to be protected by the airbag body 131 may be changed. In this case, the shape and size of the airbag body 131 are changed to a shape and size that can protect the target portion of the upper body of the occupant P.

It is possible to omit the body reinforcing fabric pieces 136, which reinforce the peripheral portions of the body fabric portions 134, 135 of the airbag body 131. In this case, although the body reinforcing sewn portion 137 may be provided or omitted, the peripheral portions of the body fabric portions 134, 135 can be reinforced by the body reinforcing sewn portion 137 alone.

Likewise, it is possible to omit the inner reinforcing fabric pieces 158, which reinforce the peripheral portions of the inner fabric portions 153, 154 of the inner bag 150. In this case, although the inner reinforcing sewn portions 159 may be provided or omitted, the peripheral portions of the inner fabric portions 153, 154 can be reinforced by the inner reinforcing sewn portions 159 alone.

Figure 19:
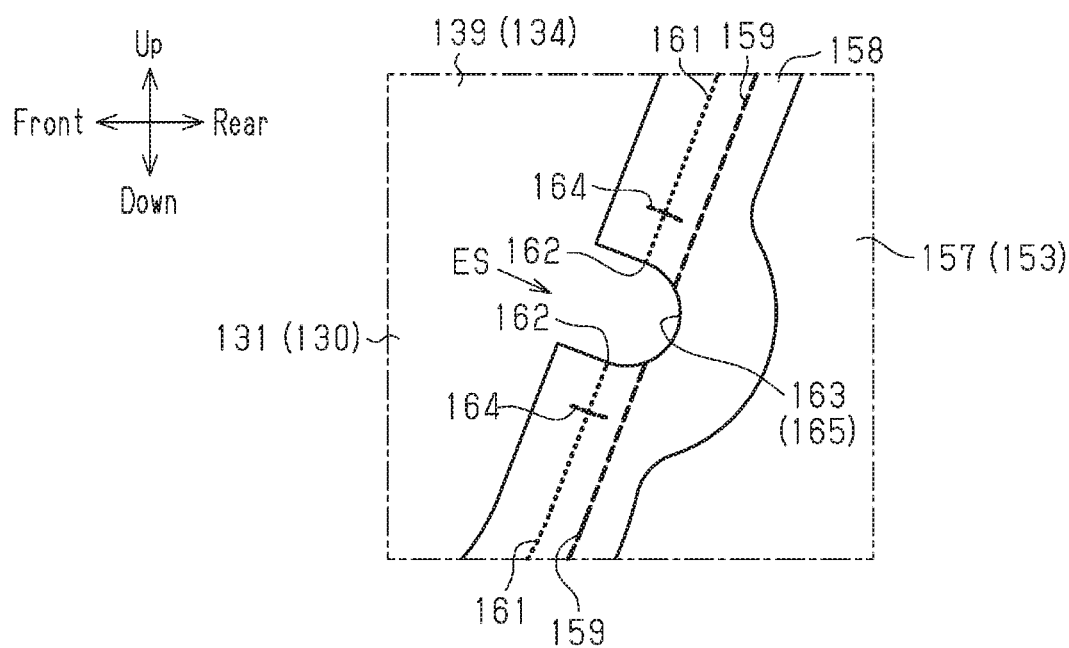
FIG. 19 is a partial cross-sectional side view showing a vent structure according a modification.

Even if the inner reinforcing fabric piece 158 is omitted, the vent reinforcing sewn portion 164 is required. In this case, the vent reinforcing sewn portion 164 needs to have at least portion that intersects with the inner peripheral sewn portion 161 at a position on the opposite side of the sewing end 162 from the notch 163. This structure is provided to stop ripping of the inner peripheral sewn portion 161. Therefore, as shown in FIG. 19, the vent reinforcing sewn portion 164 may include only the portion that intersects with the inner peripheral sewn portion 161. The vent reinforcing sewn portion 164 may have a length that is between the length shown in FIG. 19 and the length in the second embodiment shown in FIG. 10 and other drawings.

The notches may have a shape other than a semicircular shape. For example, the notches may have a semi-elliptical shape.

Figure 10:
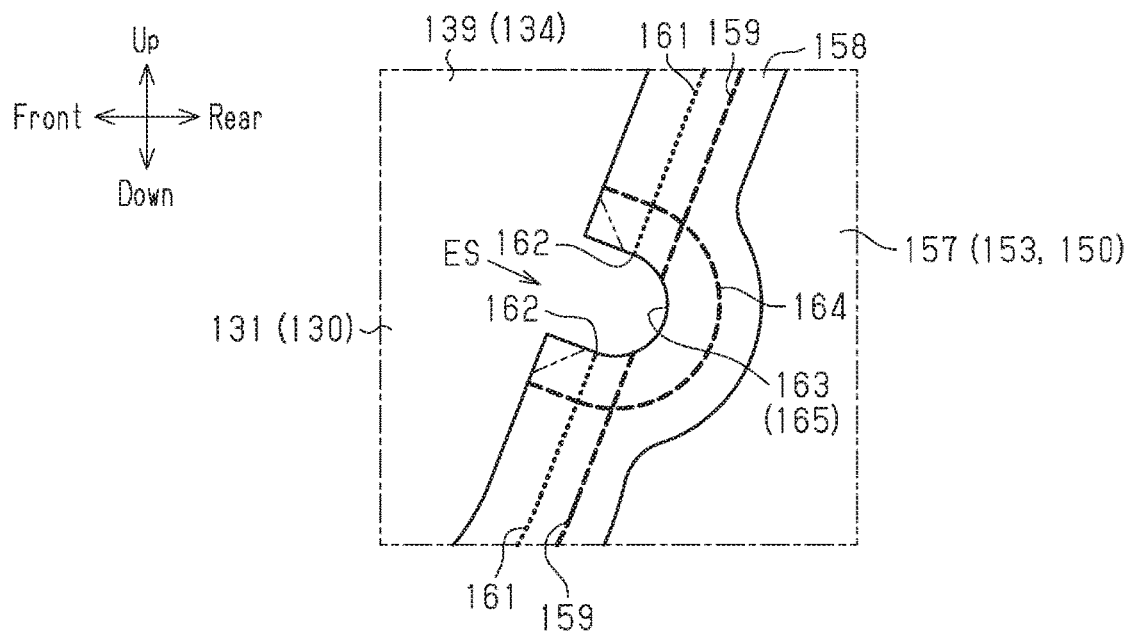
FIG. 10 is an enlarged partial cross-sectional side view illustrating a vent structure of the airbag module.

In the region of the inner fabric portions 153, 154 and the inner reinforcing fabric piece 158 that is surrounded by the notch 163, the vent reinforcing sewn portion 164, and the inner peripheral sewn portion 161 as shown in FIG. 10, the corners may be removed as indicated by the long dashed double-short dashed lines in FIG. 10.

The airbag vent structure may be applied to a side airbag apparatus of a vehicle in which a seat is arranged such that the backrest faces in a direction other than the forward direction, for example, sideways. In this case, when an impact is applied to the side of the vehicle seat (in the front-rear direction of the automobile), the side airbag apparatus protects the occupant P from the impact.

In the second embodiment, the airbag vent structure is used in the inner bag 150. Alternatively or additionally, the vent structure may be used in the body inflation portion 139 of the airbag body 131. FIG. 20 illustrates an example in which the airbag vent structure is used in the body inflation portion 139 of the airbag body 131 that is not provided with the inner bag 150 inside.

In the body inflation portion 139, the peripheral portions of the body fabric portions 134, 135, which are overlapped with each other in the thickness direction (the body fabric portion 134 not shown), are sewn to each other by the body peripheral sewn portion 138. In this case, the body peripheral sewn portion 138 has a section in which sewing is absent. The absence of sewing provides the body peripheral sewn portion 138 with two sewing ends 162, which are separated from each other. Notches 163 are provided in some sections in the peripheral portions of the body fabric portions 134, 135. Each notch 163 extends into the region surrounded by the body peripheral sewn portion 138 through and between the sewing ends 162. The body fabric portions 134, 135 have the vent reinforcing sewn portions 164, which reinforce the sections surrounding the notches 163. Each vent reinforcing sewn portion 164 of the body fabric portions 134, 135 is located on the opposite side of the corresponding sewing end 162 from the corresponding notch 163, and intersects with the body peripheral sewn portion 138.

The body fabric portions 134, 135, the body peripheral sewn portion 138, and the body inflation portion 139 in the above-described modification correspond to fabric portions, a peripheral sewn portion, and an inflation portion, respectively. This modification allows the inflation gas in the body inflation portion 139 of the airbag body 131 to be discharged in a stable manner.

The airbag body 131 of the modification may incorporate the inner bag 150 according to the second embodiment. In this case, the airbag vent structure may be optionally used in the inner bag 150 as in the second embodiment.

The airbag vent structure may be used in an airbag apparatus different from a side airbag apparatus as long as the airbag apparatus includes an inflation portion that is formed by sewing the peripheral portions of two fabric portions overlapped with each other in the thickness direction by a peripheral sewn portion and is inflated by inflation gas.

In this case, the airbag vent structure can be used not only in an airbag apparatus installed in a front seat, but also in an airbag apparatus installed in a rear seat. In this case, vehicles include not only passenger vehicles, but also industrial vehicles of various types.

The airbag vent structure may also be used in an airbag apparatus installed in a conveyance seat in a conveyance other than vehicles, for example, aircraft and ships.

The controller may be changed to have a configuration to output an activation signal to the inflator when predicting that a side impact will be applied to the side wall of the vehicle.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A side airbag apparatus, comprising an airbag that is configured to be deployed and inflated between a body side portion of a vehicle and an occupant seated in a seat in a passenger compartment by a pressure of gas supplied from an inflator, wherein
   the airbag includes:
      an outer bag, and
      an inner bag that is provided inside the outer bag and accommodates the inflator,
   the inner bag includes:
      an upper-side inflation portion, which is configured to project forward when inflated to correspond to a shoulder of the occupant,
      a lower-side inflation portion, which is configured to project forward when inflated to correspond to a lumbar region of the occupant, and
      a recessed portion provided between the upper-side inflation portion and the lower-side inflation portion, and
   the inner bag includes at least one connecting hole that connects an inside and an outside of the inner bag to each other, wherein
   a vehicle width direction is defined as a thickness direction,
   inner surfaces in the thickness direction of the outer bag are coupled to each other by a tether, the tether limiting a thickness of the outer bag,
   the tether extends through the recessed portion when the airbag is inflated,
   the connecting hole is provided in a center section of the recessed portion of the inner bag such that the connecting hole is opposed to the tether in a vehicle front-rear direction when the airbag is inflated, and
   the tether includes a through-hole at a position that is opposed to the connecting hole in the vehicle front-rear direction when the airbag is inflated.

2. The side airbag apparatus according to claim 1, wherein the connecting hole is one of two connecting holes,
   one of the connecting holes is provided in an upper section of the recessed portion of the inner bag such that the connecting hole is oriented forward and diagonally downward when the inner bag is inflated, and
   the other connecting hole is provided in a lower section of the recessed portion of the inner bag such that the connecting hole is oriented forward and diagonally upward when the inner bag is inflated.

3. The side airbag apparatus according to claim 1, wherein at least one of the upper-side inflation portion and the lower-side inflation portion in the inner bag is fixed to the outer bag.

4. The side airbag apparatus according to claim 1, wherein a part of the inner bag is provided by a part of the outer bag.

5. The side airbag apparatus according to claim 4, wherein the inner bag is formed by an inner-side base fabric piece, the outer bag is formed by an outer-side base fabric piece, and
   the inner-side base fabric piece, which includes a tuck, is sewn to a part of the outer-side fabric piece that is included in the inner bag.

6. The side airbag apparatus according to claim 1, further comprising a restriction tether that restricts forward inflation of the inner bag at a position that corresponds to the recessed portion in the inner bag.

* * * * *